(12) United States Patent
Joshi et al.

(10) Patent No.: US 9,764,301 B2
(45) Date of Patent: Sep. 19, 2017

(54) SILICA AEROGEL COMPOSITE

(71) Applicant: Nanyang Technological University, Singapore (SG)

(72) Inventors: Sunil Chandrakant Joshi, Singapore (SG); Mahesh Sachithanadam, Singapore (SG)

(73) Assignee: Nanyang Technological University, Singapore (SG)

( * ) Notice: Subject to any disclaimer, the term of this patent is extended or adjusted under 35 U.S.C. 154(b) by 130 days.

(21) Appl. No.: 14/542,260

(22) Filed: Nov. 14, 2014

(65) Prior Publication Data
US 2015/0141533 A1     May 21, 2015

Related U.S. Application Data

(60) Provisional application No. 61/904,194, filed on Nov. 14, 2013.

(51) Int. Cl.
*B01J 13/00*     (2006.01)

(52) U.S. Cl.
CPC .................. *B01J 13/0091* (2013.01)

(58) Field of Classification Search
CPC .................................................. B01J 13/0091
See application file for complete search history.

(56) References Cited

U.S. PATENT DOCUMENTS

| | | | |
|---|---|---|---|
| 5,569,513 A * | 10/1996 | Fidler | C08J 9/0066 428/304.4 |
| 6,136,216 A | 10/2000 | Fidler et al. | |
| 8,703,284 B1 * | 4/2014 | Meeks-Matous | C01B 33/163 423/445 R |
| 9,208,919 B2 * | 12/2015 | Kong | H01B 1/02 |
| 2007/0154379 A1 * | 7/2007 | Nakanishi | C01B 33/1585 423/335 |
| 2009/0035344 A1 * | 2/2009 | Thomas | A61L 27/52 424/423 |
| 2010/0152326 A1 * | 6/2010 | Kurz | C08J 3/2053 523/339 |
| 2011/0056408 A1 * | 3/2011 | Schaumburg | B01J 13/0091 106/18.32 |
| 2011/0206471 A1 * | 8/2011 | Doshi | C04B 14/064 408/1 R |
| 2012/0020106 A1 * | 1/2012 | Doshi | C09C 1/3081 362/551 |

(Continued)

OTHER PUBLICATIONS

Candau et al., "Synthesis, structure and properties of hydrophobically associating polymers," *Progress in Organic Coatings* 24:11-19, 1994.

(Continued)

*Primary Examiner* — Michael A Salvitti
(74) *Attorney, Agent, or Firm* — Seed IP Law Group LLP

(57) ABSTRACT

A method of preparing a silica aerogel composite is provided. The method includes providing an aqueous solution comprising a water soluble polymeric binder and a surfactant, adding a silyl-modified silica aerogel to the aqueous solution to form a mixture, and freeze-drying the mixture under reduced pressure at a temperature sufficient to sublime water in the mixture to obtain the silica aerogel composite. A silica aerogel composite is also provided.

16 Claims, 16 Drawing Sheets

(56) References Cited

U.S. PATENT DOCUMENTS

| | | | | |
|---|---|---|---|---|
| 2012/0097907 A1* | 4/2012 | Bauer | | C04B 14/064 252/602 |
| 2012/0128958 A1* | 5/2012 | Zeng | | C01B 33/1585 428/219 |
| 2012/0326071 A1* | 12/2012 | Pasquero | | C08J 9/0066 252/62 |
| 2014/0361209 A1* | 12/2014 | Yrieix | | C04B 14/064 252/62 |
| 2015/0141533 A1* | 5/2015 | Joshi | | B01J 13/0091 516/111 |
| 2015/0320663 A1* | 11/2015 | Bebot | | A61K 8/25 424/401 |
| 2015/0320664 A1* | 11/2015 | Bebot | | A61K 8/25 424/401 |
| 2015/0335536 A1* | 11/2015 | Moneuze | | A61K 8/25 424/401 |
| 2015/0366783 A1* | 12/2015 | Fondin | | A61K 8/25 424/70.1 |

OTHER PUBLICATIONS

Chanda et al., *Industrial Polymers, Specialty Polymers, and Their Applications*, CRC Press, 2008, Chapter 1, "Industrial Polymers," pp. 1-161.

Cheng et al., "DNA Demethylating Agents: Concepts," in Esteller (ed.), *DNA Methylation—Approaches, Methods, and Applications*, CRC Press, 2004, pp. 151-167.

Cheong et al., "Physical Adsorption of Water-Soluble Polymers on Hydrophobic Polymeric Membrane Surfaces viaSalting-Out Effect," *Macromolecular Research 21*(6):629-635, Jun. 2013.

Fang et al., "Lithium chloride-catalyzed selective demethylation of aryl methyl ethers under microwave irradiation," *Journal of Molecular Catalysis A: Chemical 274*:16-23, 2007.

Frydrych et al., "Structure and mechanical properties of gelatin/sepiolite nanocomposite foams," *J. Mater. Chem. 21*:9103-9111, 2011.

Ge et al., "Hydrophobic and thermal insulation properties of silica aerogel/epoxy composite," *Journal of Non-Crystalline Solids 355*:2610-2615, 2009.

Gennadios, *Protein-Based Films and Coatings*, CRC Press, 2002, Chapter 16, "Soft Gelatin Capsules," 51 pages.

Gupta et al., "Processing and compressive properties of aerogel/epoxy composites," *Journal of Materials Processing Technology 198*:178-182, 2008.

Jones et al., "Demethylation of 2,4-dimethoxyquinolines: the synthesis of atanine," *Org. Biomol. Chem. 1*:4380-4383, 2003.

Lübbert et al., "DNA Demethylating Agents: Clinical Uses," in Esteller (ed.), *DNA Demethylation—Approaches, Methods, and Applications*, CRC Press, 2004, pp. 183-212.

Rao et al., "Synthesis and Characterization of Hydrophobic Silica Aerogels Using Trimethylethoxysilane as a Co-Precursor," *Journal of Sol-Gel Science and Technology 27*:103-109, 2003.

Sachithanadam et al., "A New Phenomenon of Compressive Strain Recovery in Gelatin-Silica Aerogel Composites with SDS," *Procedia Engineering 75*:51-55, 2014.

Sachithanadam et al., "High strain recovery with improved mechanical properties of gelatin-silica aerogel composites post-binding treatment," *Journal of Materials Science 49*(1): 163-179, Jan. 2014.

Schweitzer, *Corrosion of Polymers and Elastomers*, CRC Press, 2006, Chapter 2, "Thermoplastic Polymers," pp. 19-146.

Vaida et al., "Water: The Tough-Love Parent of Life," in Lynden-Bel et al. (eds.), *Water and Life—The Unique Properties of $H_2O$*, CRC Press, 2010, pp. 235-247.

* cited by examiner

SILICA AEROGEL COMPOSITE

CROSS-REFERENCE TO RELATED APPLICATION

This application claims the benefit of priority of U.S. provisional application No. 61/904,194 filed on 14 Nov. 2013, the content of which is incorporated herein by reference in its entirety for all purposes.

TECHNICAL FIELD

Various embodiments relate to silica aerogel composite.

BACKGROUND

Silica aerogels are very light and highly porous (about 98% air). They offer large internal surface area, extremely low density (0.08 g/cm$^3$ to 0.10 g/cm$^3$), and low thermal conductivity (0.01 W/m–K at −200° C. to 0.035 W/m–K at 100° C.). These properties render them suitable as thermal and/or acoustics insulators, or as optical devices, electrical devices, and/or energy storing devices.

Silica aerogels, however, are brittle. Moreover, they are generally synthesized in monolithic or granular form, which makes their processing and handling difficult. Volumetric shrinkage also occurs, and the effects become increasingly apparent at elevated temperatures. These severely limit their use in various applications. Even though attempts have been made to dope silica aerogels with materials such as polymer, ceramics, and metals to improve their mechanical properties, any such improvements may be compromised by undesirable increases in density as well as reduction in insulation performance.

State of the art methods to produce aerogel hybrid composites include a sol-gel method. Using the sol-gel method, modifications may be made to the silica backbone structure during gelation of the precursors to obtain a stronger, stiffer, and more flexible aerogel. This improvement, however, may be carried out at the expense of increase in density and increase in thermal conductivity of the aerogel hybrid composite. Moreover, large quantities of solvent for fluid exchange are required prior to drying. Hazardous substances used in manufacturing the composites may also compromise workplace safety and health of personnel involved.

Apart from the above-mentioned, binders have been used to modify aerogels to produce solid composites. For example, tackiness of polymeric resins, such as epoxy and ethylene vinyl acetate (EVA) resins, has been leveraged on in promoting adhesion of the solid composites.

Post-synthesized modification of silica aerogels by binders, however, presents another set of problems. Firstly, infiltration of binder material into pores of aerogels may fill the pores partially or completely, resulting in surface area reduction and density increase of the aerogels. Moreover, when polymeric resins are used as binders for silica aerogels, the resins, being much denser, tend to settle at the bottom during curing, and results in a non-uniform mixture. Many of these binding systems use organic solvents such as acetone and toluene in the mixture, which may cause the resins to infiltrate rapidly into the nano-pores. This may collapse the aerogel structure completely, such as that shown in FIG. 1. These solvents are furthermore hazardous to health, and their volatility may compromise safety of personnel working with these chemicals.

In view of the above, there exists a need for improved methods of preparing composites that overcome or at least alleviate one or more of the above-mentioned problems.

SUMMARY

In a first aspect, a method of preparing a silica aerogel composite is provided. The method comprises
a) providing an aqueous solution comprising a water soluble polymeric binder and a surfactant,
b) adding a silyl-modified silica aerogel to the aqueous solution to form a mixture, and
c) freeze-drying the mixture under reduced pressure at a temperature sufficient to sublime water in the mixture to obtain the silica aerogel composite.

In a second aspect, a silica aerogel composite is provided. The silica aerogel composite is prepared by a method comprising
a) providing an aqueous solution comprising a water soluble polymeric binder and a surfactant,
b) adding a silyl-modified silica aerogel to the aqueous solution to form a mixture, and
c) freeze-drying the mixture under reduced pressure at a temperature sufficient to sublime water in the mixture to obtain the silica aerogel composite.

BRIEF DESCRIPTION OF THE DRAWINGS

The invention will be better understood with reference to the detailed description when considered in conjunction with the non-limiting examples and the accompanying drawings, in which:

FIG. 1A is a scanning electron microscopy (SEM) image depicting inadequate binding of aerogel granules with epoxy and FIG. 1B is also an SEM image showing collapse of aerogel granules due to unfavorable binder type. Scale bar in FIG. 1A and FIG. 1B denote 20 µm and 10 µm respectively.

FIG. 4A shows the initial loading; FIG. 4B shows the compression test undergoing compression at uniform rate; FIG. 4C shows the data display after 45% compressive strain; and FIG. 4D shows the specimen showing strain recovery after unloading.

DETAILED DESCRIPTION

Figure 1A:
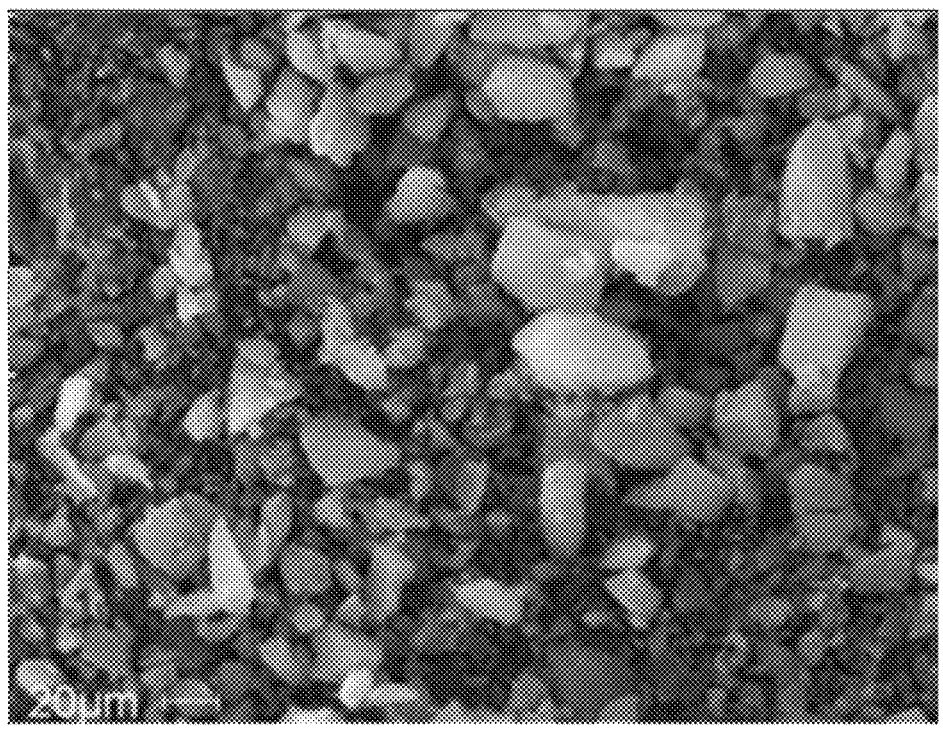
FIG. 1A and FIG. 1B show inadequately bonded silica aerogel granules and collapsed aerogel granules when mixed with epoxy-acetone solution, respectively.
Figure 1B:
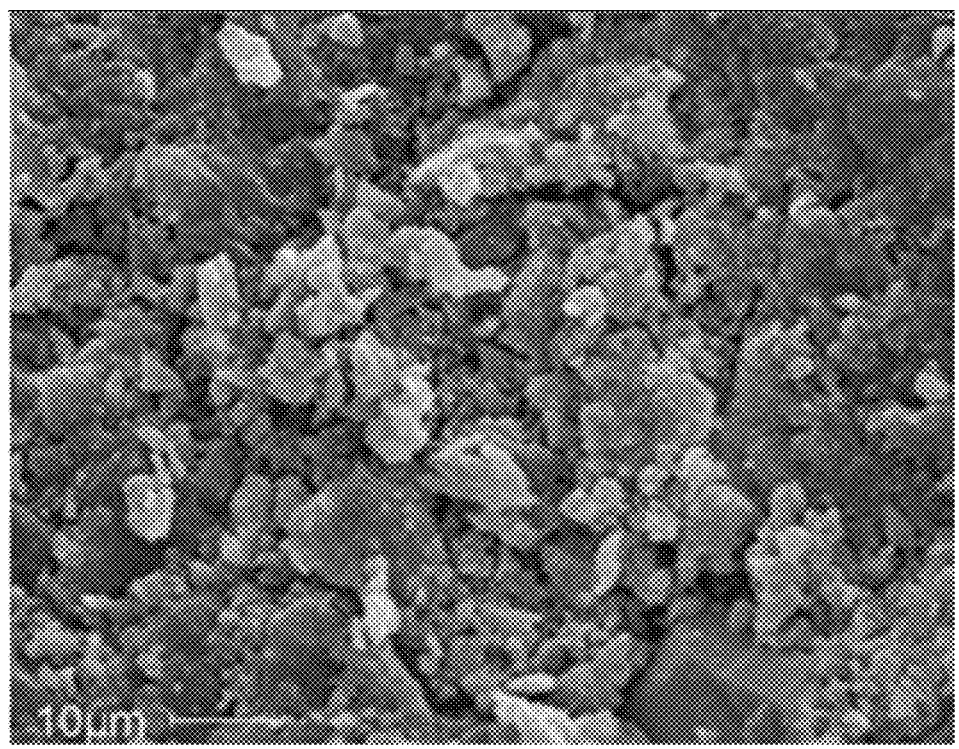

In a first aspect, various embodiments refer to a method of preparing a silica aerogel composite.

The method includes providing an aqueous solution comprising a water soluble polymeric binder and a surfactant, adding a silyl-modified silica aerogel to the aqueous solution to form a mixture, and freeze-drying the mixture under reduced pressure at a temperature sufficient to sublime water in the mixture to obtain the silica aerogel composite.

By mixing a water-soluble polymeric binder with a surfactant in solution, the solution containing the water soluble polymeric binder may froth into foam. This may be carried out, for example, by agitating using a mixer such as a froth mixer. Sonication may be used prior to frothing to improve solubility of polymeric binder and surfactant in water, as well as to improve mixing of the polymeric binder and surfactant. Frothing the solution increases pockets of air trapped between two adjacent bubbles, due to increased formation of bubbles. When aerogel is dispersed into the foam and mixed gently, the aerogel may break into the bubbles and occupy the air pockets. The foamed solution thus provides a 'net-like' catchment to distribute the aerogel throughout the foamed solution. The surfactant may aid in clumping the aerogel with the water soluble polymeric binder foam. Advantageously, increased foaming due to presence of the surfactant may result in reduced density of the silica aerogel composite.

Further, during freeze-drying, the vacuum facilitates a tight packing order of the aerogels, thereby minimizing voids and pores in the foamed mixture. Dual action of temperature and vacuum on the foamed mixture may sublime water present in the foamed mixture. In so doing, water is removed from the foamed mixture, leaving only the water soluble polymeric binder and silica aerogel. This allows physical binding of the binder to the aerogel to form a network structure, without the need to form covalent bonds between the two materials. In embodiments disclosed herein, this simultaneous action of foaming and freeze-drying result in production of very light composites which possess densities similar to that of the aerogel used.

The method includes providing an aqueous solution comprising a water soluble polymeric binder and a surfactant.

The water soluble polymeric binder and the surfactant may be added at the same time or in a sequential manner to an aqueous medium. For example, the water soluble polymeric binder may be added to an aqueous medium, followed by addition of the surfactant. The water soluble polymeric binder may at least be substantially dissolved or completely dissolved in the aqueous medium before the surfactant is added. The term "aqueous medium" as used herein refers to water, or a solution based primarily on water such as phosphate buffered saline (PBS), or water containing a salt dissolved therein. In various embodiments, the aqueous medium is water.

In various embodiments, providing the aqueous solution comprising a water soluble polymeric binder and a surfactant include dissolving the water soluble polymeric binder in an aqueous medium, and adding the surfactant to the aqueous medium comprising the water soluble polymeric binder.

As used herein, the term "water soluble polymeric binder" refers to a polymeric material which is at least substantially soluble in an aqueous medium and which is capable of holding or attaching two or more materials together.

The water soluble polymeric binder may include at least one of —COOH or —NH$_2$ functional groups on a surface of the water soluble polymeric binder. In various embodiments, the water soluble polymeric binder is selected from the group consisting of gelatin, collagen, polyacrylamide, polyvinyl pyrrolidone, polymethacrylamide, polyvinyl alcohol, and combinations thereof.

In specific embodiments, the water soluble polymeric binder comprises or consists of gelatin. The term "gelatin" as used herein refers to protein substances derived from collagen, and also includes equivalent substances such as synthetic analogues of gelatin. Generally, gelatin may be classified as alkaline gelatin, acidic gelatin, or enzymatic gelatin. Alkaline gelatin may be obtained from the treatment of collagen with a base such as sodium hydroxide or calcium hydroxide. Acidic gelatin may be obtained from the treatment of collagen with an acid such as hydrochloric acid. Enzymatic gelatin may be obtained from the treatment of collagen with an enzyme such as hydrolase.

Advantageously, gelatin is a bio-degradable polymer, and is non-toxic and non-hazardous. It is soluble in water and foams well. As gelatin has both polar and non-polar side chains and numerous amine and carboxyl sites, these attributes render it a good binding agent for silica aerogels, where the amine and carboxyl sites offer reactive sites for cross-linking, functionalization, and even grafting of hydrophobic materials onto its peptide chain. It is also versatile enough to be synthesized as polymer blends.

Besides the water solution polymeric binder, the aqueous solution also includes a surfactant. The surfactant may be added to an aqueous medium comprising the water soluble polymeric binder. As mentioned above, presence of surfactant in solution with the water soluble polymeric binder induces foaming and/or increases foaming capacity of the aqueous solution containing the water soluble polymeric binder.

Figure 8A:
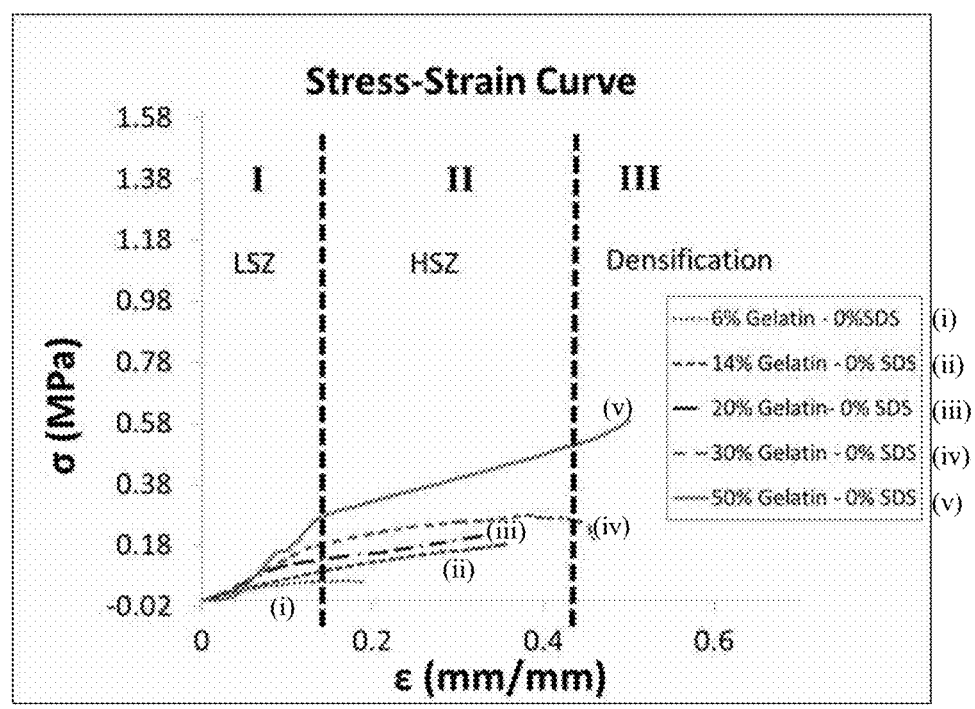
FIGS. 8A and 8B are graphs showing compressive stress-strain response of selected composites specimens, where (A) composites without SDS, and (B) composites with SDS.
Figure 8B:
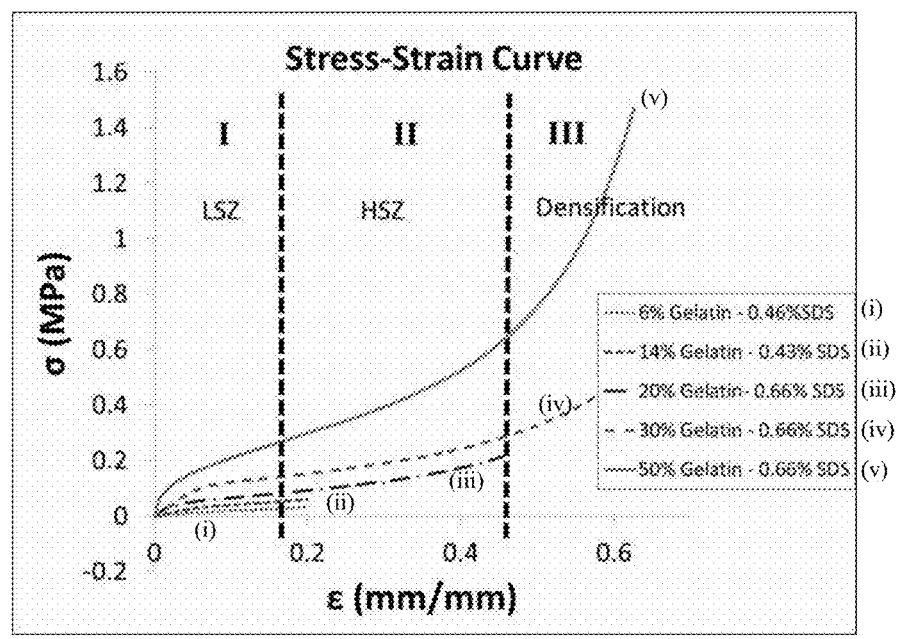

In addition to the above, the present inventors have found that silica aerogel composites prepared in presence of a surfactant possess good compressive strength and modulus, with density and thermal conductivity values comparable to those of silica aerogel. Compared to that of silica aerogel, the silica aerogel composites obtained are not as brittle and did not rupture easily. Mechanical tests carried out on the silica aerogel composites demonstrated three distinct stages. The first stage was marked by a steep gradient, the second stage showed a gentler slope and a steady rise, followed by a densification stage, before failure of the composite, such as that shown in FIG. 8A and FIG. 8B.

Suitable surfactants may include an ionic surfactant, such as an anionic surfactant, a cationic surfactant, an amphoteric surfactant, or mixtures thereof.

Examples of an anionic surfactant may include, but are not limited to, sodium dodecyl sulfate (SDS), sodium pentane sulfonate, dehydrocholic acid, glycolithocholic acid ethyl ester, ammonium lauryl sulfate and other alkyl sulfate salts, sodium laureth sulfate, alkyl benzene sulfonate, soaps, fatty acid salts or mixtures thereof.

Examples of a cationic surfactant may include, but are not limited to, cetyl trimethylammonium bromide (CTAB), dodecylethyldimethylammonium bromide (D12EDMAB), didodecyl ammonium bromide (DMAB), cetylpyridinium chloride (CPC), polyethoxylated tallow amine (POEA), hexadecyltrimethylammonium p-toluenesulfonate, benzalkonium chloride (BAC), benzethonium chloride (BZT) and mixtures thereof.

Examples of an amphoteric surfactant may include, but are not limited to, dodecyl betaine, sodium 2,3-dimercaptopropanesulfonate monohydrate, dodecyl dimethylamine oxide, cocamidopropyl betaine, 3-[N,N-dimethyl(3-palmitoylaminopropyl)ammonio]-propanesulfonate, coco ampho glycinate and mixtures thereof.

In various embodiments, the surfactant is an ionic surfactant selected from the group consisting of an anionic carboxylate, a cationic quaternary ammonium salt, an amphoteric sulfonate, an amphoteric carboxylate, an amphoteric phosphate, and combinations thereof.

In some embodiments, the surfactant is selected from the group consisting of sodium dodecyl sulfate (SDS), cetyl trimethylammonium bromide (CTAB), perfluorononanoate (PFOA), lecithin, and combinations thereof. In specific embodiments, the surfactant comprises or consists of sodium dodecyl sulfate.

Amount of surfactant in the aqueous medium comprising the water soluble polymeric binder may be in the range of about 0.01 wt % to about 0.66 wt %. For example, amount of surfactant in the aqueous medium comprising the water soluble polymeric binder may be in the range of about 0.05 wt % to about 0.66 wt %, about 0.1 wt % to about 0.66 wt %, about 0.15 wt % to about 0.66 wt %, about 0.33 wt % to about 0.66 wt %, about 0.33 wt % to about 0.56 wt %, about 0.56 wt % to about 0.66 wt %, about 0.33 wt %, about 0.56 wt %, or about 0.66 wt %. In specific embodiment, amount of surfactant in the aqueous medium comprising the water soluble polymeric binder is about 0.56 wt %.

Dissolving the water soluble polymeric binder in the aqueous medium, and adding the surfactant to the aqueous medium comprising the water soluble polymeric binder may be carried out under agitation. For example, agitating may comprise sonicating, stirring, or bubbling the solution. The agitation may be carried out to facilitate dissolving of the water soluble polymeric binder, to enhance mixing of the water soluble polymeric binder with the surfactant, and/or to improve frothing of the aqueous solution. In some embodiments, sonicating the water-soluble polymeric binder with a surfactant in solution is carried out to improve solubility of the polymeric binder and surfactant in water, and may not result in frothing.

In various embodiments, adding the surfactant to the aqueous medium comprising the water soluble polymeric binder is carried out using a mixer such as a froth mixer, so as to allow or to enhance frothing.

In some embodiments, providing an aqueous solution comprising a water soluble polymeric binder and a surfactant comprises mixing the aqueous solution comprising the water soluble polymeric binder and the surfactant to form a froth solution. This may be carried out, for example, by agitating the aqueous solution with a mixer to form the froth solution. As used herein, the terms "froth" and "foam" are used interchangeably, and refer to an intimate mixture of gas and liquid, where the gas is present as bubbles and dispersed throughout the liquid. Advantageously, addition of a separate frothing agent is not required as mixing of the water-soluble polymeric binder with the surfactant results in generation of foam.

Amount of water soluble polymeric binder in the aqueous medium may be in the range of about 10 wt % to about 50 wt %. For example, amount of water soluble polymeric binder in the aqueous medium may be in the range of about 10 wt % to about 40 wt %, about 10 wt % to about 30 wt %, about 10 wt % to about 20 wt %, about 20 wt % to about 50 wt %, about 30 wt % to about 50 wt %, about 40 wt % to about 50 wt %, about 15 wt % to about 45 wt %, about 25 wt % to about 35 wt %, or about 20 wt % to about 40 wt %.

The method of preparing a silica aerogel composite includes adding a silyl-modified silica aerogel to the aqueous solution to form a mixture. The silyl-modified silica aerogel may be obtained from suppliers, whereby silyl groups such as trimethylsilyl functional groups, are already present on the silica aerogel. Additionally or alternatively, silyl groups may be grafted onto silica aerogel using any suitable process as would be known to a person skilled in the relevant technical field, to form silyl-modified silica aerogel.

The silyl-modified silica aerogel may include one or more —SiR$_3$ functional groups, wherein R at each occurrence is independently a $C_1$—$C_5$ alkyl group. For example, the silyl-modified silica aerogel may include one or more of —SiCH$_3$, —Si(CH$_3$)$_2$(C$_2$H$_5$), —Si(CH$_3$)(C$_2$H$_5$)$_2$, —Si(C$_2$H$_5$)$_3$, —Si(C$_3$H$_7$)$_2$(C$_2$H$_5$), to name only a few.

In various embodiments, R is —CH$_3$. For example, the silyl-modified silica aerogel may contain trimethylsilyl terminal groups.

The silyl-modified silica aerogel may be in the form of particles or granules. Generally, the silyl-modified silica aerogel may be of any suitable shape and size. The silyl-modified silica aerogel granules may have a regular shape such as a cube, a sphere, a pyramid, or be irregularly shaped. Size of the silyl-modified silica aerogel may be characterized by its maximal dimension, which refers to maximum length of each granule in any direction. Size of the silyl-modified silica aerogel may be in the range of about 0.05 cm to about 0.5 cm, such as about 0.1 cm to about 0.5 cm, about 0.2 cm to about 0.5 cm, about 0.3 cm to about 0.5 cm, about 0.05 cm to about 0.4 cm, about 0.05 cm to about 0.3 cm, about 0.1 cm to about 0.4 cm, about 0.1 cm to about 0.3 cm, or about 0.12 cm to about 0.26 cm.

As the water-soluble polymeric binder is hydrophilic, bonding between the water-soluble polymeric binder and water may be achieved through hydrogen bonds and weak Van der Waals' interaction. Water-soluble polymeric binders, such as gelatin, are able to covalently bind with the silyl groups such as oxy-TMS groups present on the silyl-modified silica aerogels, or at least be physically adsorbed to the silica aerogels via their charges.

The method includes freeze-drying the mixture under reduced pressure at a temperature sufficient to sublime water in the mixture to obtain the silica aerogel composite.

Various embodiments of the freeze-drying technique disclosed herein are based upon principle of sublimation of water, to bind the aerogel to a foamed mixture of water soluble polymeric binder and surfactant.

Figure 2:
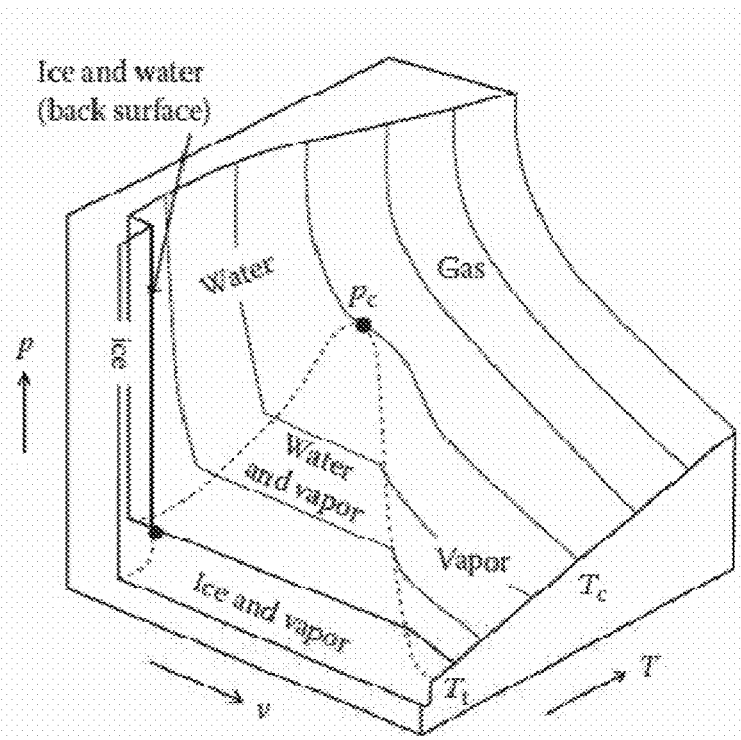
FIG. 2 is a phase diagram of water (all three phases may exist at triple point, $T_t$=273 K, $p_t$=611.73 kPa).

Without wishing to be bound by theory, principle of water sublimation is briefly explained using the phase diagram of water shown in FIG. 2. As shown in the figure, the melting pressure curve, vapour pressure curve and sublimation pressure curve meet in one point called the triple point of water. This specific point is defined at a temperature $T_t$ of 273 K (0° C.) and pressure $p_t$ of 611.73 kPa (6.11 mbar). At this point, all three phases of solid, liquid, and gas of water occur simultaneously. When processing pressure is greater than 6.11 mbar, water may assume either one of the phases depending on temperature. When processing pressure is lowered to less than 6.11 mbar, ice, which is solid phase of water, may be converted directly to gaseous phase on reaching the sublimation pressure curve.

As mentioned above, during freeze-drying, simultaneous action of vacuum and temperature facilitates a tight packing order of the aerogels, thereby minimizing voids and pores in the foamed mixture. At the same time, water present in the foamed mixture may sublime. In so doing, water may be removed from the foamed mixture to leave only the binder and the aerogel. This allows physical binding of the water soluble polymeric binder to the aerogel granules to form a network structure without the need to form covalent bonds. In some embodiments, there is a slight reduction in porosity of aerogels as the aerogel granules are also subjected to vacuum.

Advantageously, by controlling pressure and temperature of the mixture, water may be evaporated or sublimed from the mixture to form the silica aerogel composite. This renders the process green as non-hazardous and non-toxic solvents are not used. Furthermore, porous network structure of the aerogels is not affected, which means that properties such as density and surface area of the aerogels are not compromised.

Freeze-drying the mixture may be carried out at any suitable temperature which is sufficient to sublime water that is present in the mixture. In various embodiments, freeze-drying the mixture is carried out at a temperature in the range of about −50° C. to about 0° C., such as about −30° C. to about 0° C., about −10° C. to about 0° C., about −50° C. to about −10° C., about −50° C. to about −20° C., about −50° C. to about −30° C., about −40° C. to about −10° C., about −30° C. to about −20° C. In some embodiments, freeze-drying the mixture is carried out at a temperature of about −45° C.

Following the freeze-drying process, self-supporting blocks of the silica aerogel composites may be formed.

Additives, such as carbon nanotubes, may be incorporated in the silica aerogel composite, by adding the additives during preparation of the composite.

In various embodiments, providing the aqueous solution comprising a water soluble polymeric binder and a surfactant comprises adding carbon nanotubes to the aqueous solution. The carbon nanotubes may be added to improve hydrophobicity and/or to reduce thermal conductivity of the silica aerogel composite.

The carbon nanotubes may be single-walled (SWNT), double-walled (DWNT), or multi-walled carbon nanotubes (MWNT). Single-walled carbon nanotubes may be described as a graphite plane, or a graphene sheet, rolled into a hollow cylindrical shape so that the structure is one-dimensional with axial symmetry, and in general exhibiting a spiral conformation called chirality. Double-walled or multi-walled nanotubes are made up of numerous cylinders tightly stuck into another. In various embodiments, the carbon nanotubes comprise or consist of multi-walled carbon nanotubes.

The carbon nanotubes may be functionalized by reactive groups such as —COOH and —OH. For example, different functionalised CNTs may be formed according to the type of reactive functional groups present in the aqueous solution containing the water soluble polymeric binder. In various embodiments, the carbon nanotubes comprise or consist of multi-walled carbon nanotubes which are functionalized with —COOH groups (MWCNT-COOH).

Amount of nanotubes in the aqueous solution may be 0.084 wt % or less. For example, amount of nanotubes in the aqueous solution may be in the range of about 0.01 wt % to about 0.084 wt %, about 0.03 wt % to about 0.084 wt %, about 0.05 wt % to about 0.084 wt %, about 0.07 wt % to about 0.084 wt %, about 0.01 wt % to about 0.07 wt %, about 0.01 wt % to about 0.05 wt %, about 0.03 wt % to about 0.07 wt %, about 0.03 wt % to about 0.05 wt %, about 0.05 wt % to about 0.07 wt %, or about 0.084 wt %.

Various embodiments refer in a further aspect to a silica aerogel composite prepared by a method according to the first aspect. Suitable water soluble polymeric binders, surfactants, and silica aerogels that may be used have already been discussed above.

In various embodiments, the silica aerogel composite has a density in the range of about 0.059 g/cm$^3$ to about 0.115 g/cm$^3$, which are comparable to density of silica aerogel granules.

In various embodiments, the silica aerogel composite has a thermal conductivity in the range of about 0.018 W/m·K to about 0.032 W/m·K. Thermal conductivity of the silica aerogel composite may, for example, be determined using Lee's Disc method, as would be known to a person skilled in the relevant technical field.

In embodiments where the silica aerogels contain carbon nanotubes, thermal insulation properties of the silica aerogels are generally superior compared to those that do not contain carbon nanotubes. In view of the low thermal conductivity values, embodiments described herein may find potential use in cold/hot storage, cold/hot goods transport vehicles, heat protection in buildings, defense applications, and housing insulation in extremely cold countries as a good natural energy saver, to name only a few.

In various embodiments, the silica aerogel composite has a strain recovery of about 60% to about 90% of the applied strain. For example, the silica aerogel composite may have a strain recovery of about 75% to about 90% of the applied strain, such as about 80% to about 90%, about 65% to about 85%, about 70% to about 80%, or about 75% to about 85%. The high strain recovery values alleviate problems presented by state of the art silica aerogels, where brittleness of the silica aerogels renders their processing and handling difficult. Advantageously, the improved strain recovery properties of the silica aerogel composite extend application capabilities of silica aerogels, since the silica aerogel composite has improved mechanical properties while still retaining many or all of the advantageous properties of silica aerogel.

In various embodiments, composites described herein were respectively tested in liquefied nitrogen gas as well as in oven, and have demonstrated stability when subjected to operating temperatures in the range of about −180° C. to about 200° C. In particular, hydrophobicity of the composites containing CNTs have demonstrated prolonged stability when immersed in water. In one embodiment, a 50/50 gelatin-silica aerogel composite prepared using 0.33 wt % SDS and which contained 0.042 wt % carbon nanotubes was able to last for 13 weeks in water without degrading. The stability in the wide operating temperature range may provide applicability in extreme temperature conditions by aircrafts, solar panels, and deep water offshore explorations, to name only a few.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Methods disclosed herein are able to form aerogel composites with improved mechanical properties, while retaining properties such as low density and low thermal conductivity of aerogels.

The composites fabricated may particularly be suitable for applications where compressibility, cushioning properties and/or hydrophobicity are important. They have potential applications in aerospace, automobile, locomotive, marine, defense, sports goods and housing. The fabrication methodologies are simple, easy to adopt and economical for commercial viability.

Features according to various embodiments include:
(i) Use of water soluble polymer as binder for producing the composites.
(ii) Establish processing parameters for producing aerogel-binder composites using freeze-drying and frothing fabrication techniques.
(iii) Addition of small or negligible amounts of surfactant to result in cellular solids-like compression behavior of binder-surfactant-aerogel composites.
(iv) Composites fabricated exhibited high strain post-compression recovery in the binder-surfactant-aerogel composites, which is an unusual phenomenon associated with extremely brittle silica aerogels.
(v) Mixing of a small amount of carbon nanotube in the form of additives leading to a hydrophobic and water-repellent composite product.
(vi) The above (i) to (v) features have been achieved by minimal impact on thermal conductivity or density values of silica aerogels.

Constituents in various embodiments of the composites include commercially available aerogel granules, binder material with suitable solvent, surfactant, and additive in various proportions. The composites were evaluated for properties such as compressibility and subsequent strain recovery, Young's modulus and strength, thermal conductivity, and finally, hydrophobicity, as set out in the following examples.

Example 1

Materials

Commercially procured hydrophobic silica aerogel granules are used to develop these composites. The aerogels used is trade named Lumira® LA1000. These silica aerogels, although inherently hydrophilic, render the aerogel granules hydrophobic due to the chemically inert trimethylsilyl (TMS) terminal groups present in the coating applied on the silica aerogels' surfaces. These silica aerogel translucent granules, with bulk density of 0.08 g/cm$^3$ to 0.10 g/cm$^3$, porosity of greater than 90%, pore diameter about 20 nm, surface area of 600 m$^2$/g to 800 m$^2$/g were purchased from Cabot Corp® (USA).

Gelatin, a water soluble polymer, with numerous side chains, is used as the main binder adopted with and without negligible amounts of (SDS) as additive. The high strength Gelatin from porcine skin (bloom strength 240 to 270; density about 1.043 g/cm$^3$) and SDS (density=0.37 g/cm$^3$) were purchased from Sigma Aldrich.

Functional MWCNT-COOHs were purchased from Nanostructured & Amorphous Materials, Inc.

Example 2

Instrumentation

Sonication of gelatin solution was carried out on Fisher Scientific FB15051. The GSA-SDS composite blocks were weighed on a 4-decimal accurate weighing balance, AB201-S Mettler Toledo, USA. The composite blocks were freeze dried using Christ Martin Alpha 1-2 LDplus Freeze Dryer. The compression testing of all the specimens was carried out on Universal Testing Machine, INSTRON 5569 load frame with a calibrated 500 N±4% load cell.

Example 3

Fabrication of GSA-SDS composites

Figure 3A:
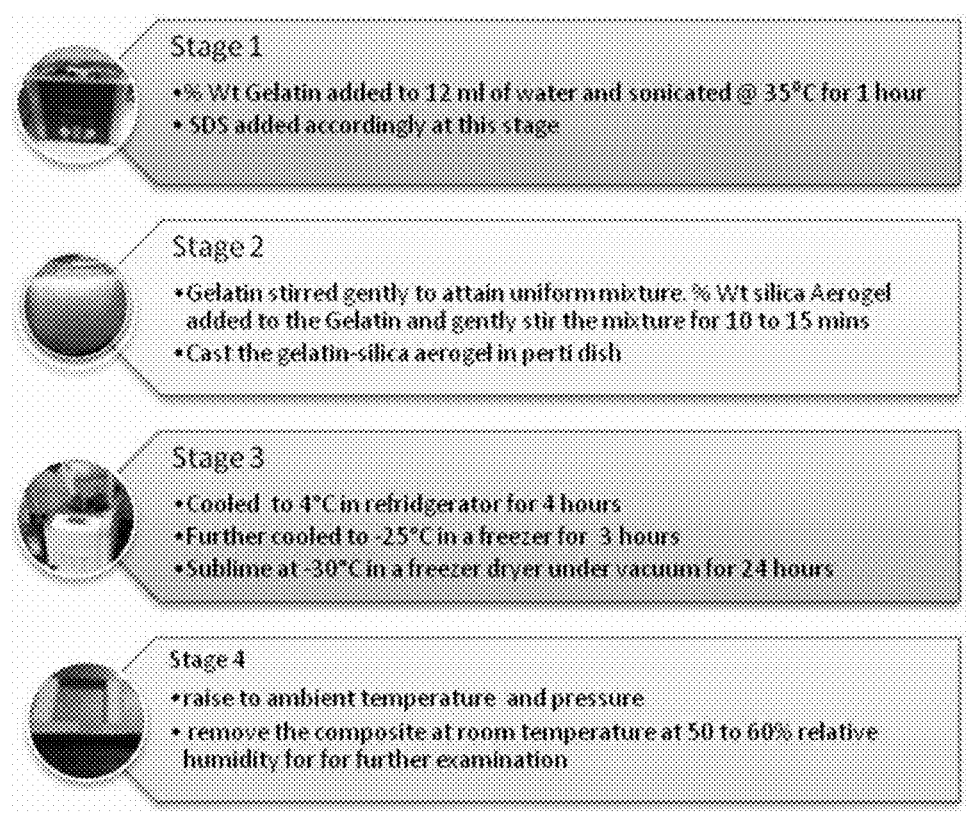
FIG. 3A is a diagram summarizing fabrication steps of composite via freeze-drying method according to an embodiment. In the embodiment shown, Stage 1 includes adding gelatin to 12 ml of water and sonicating at 35° C. for 1 hour. Surfactant SDS is added accordingly at this stage. In Stage 2, gelatin is stirred gently to attain uniform mixture. Silica aerogel is added to the gelatin and gently stirred for 10 to 15 minutes. The gelatin-silica aerogel sample is cast in a petri dish. In Stage 3, the gelatin-silica aerogel sample is cooled to 4° C. in a refrigerator for 4 hours, and further cooled to −25° C. in a freezer for 3 hours. The resulting gelatin-silica aerogel sample is allowed to sublime at −30° C. in a freezer dryer under vacuum for 24 hours. In Stage 4, the composite is raised to ambient temperature and pressure, and subsequently removed at room temperature at 50 to 60% relative humidity for further examination.
Figure 3B:
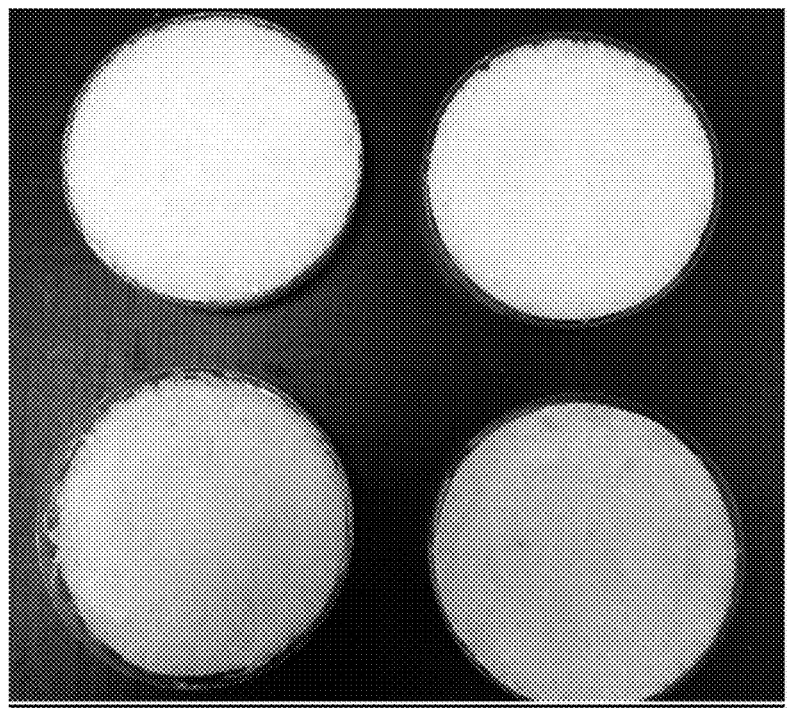
FIG. 3B and FIG. 3C are photographic images of gelatin-silica aerogel-sodium dodecyl sulfate (GSA-SDS) specimens using freeze-drying.
Figure 3C:
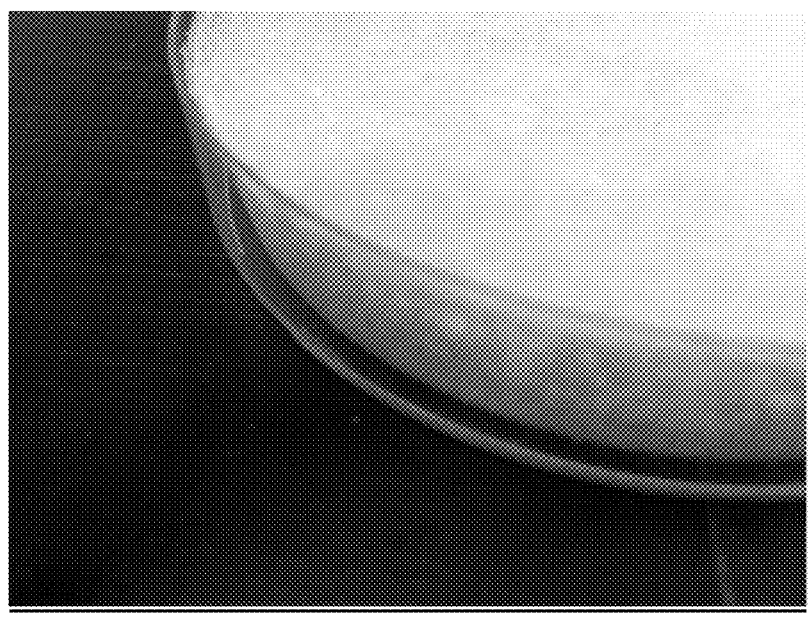
Figure 4A:
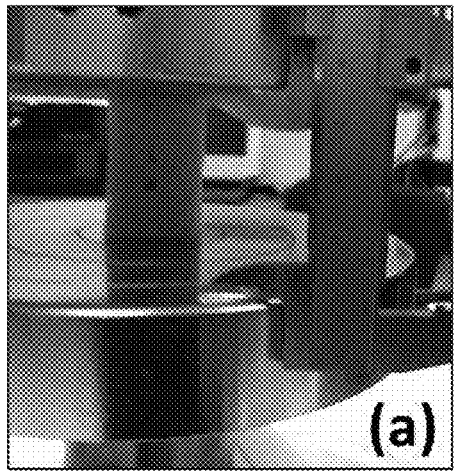
FIG. 4A to 4D are photographs showing a compression test carried out in the experiments, where
Figure 4B:
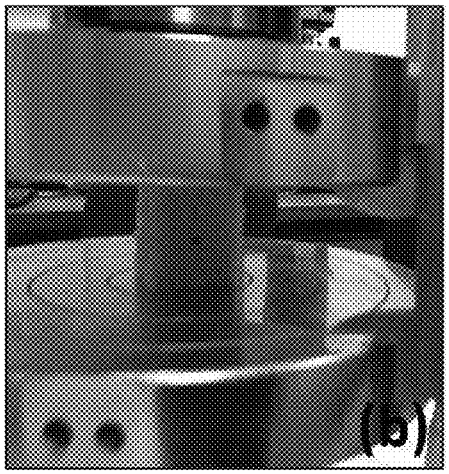
Figure 4C:
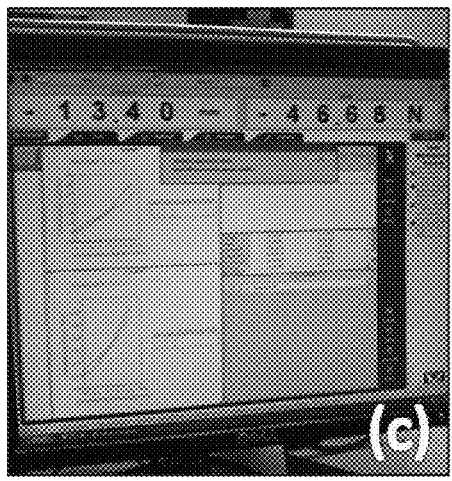
Figure 4D:
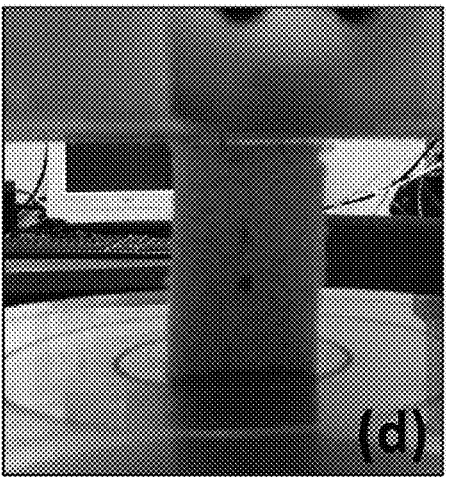

Various aqueous solutions with 10 wt % to 50.0 wt % quantities of gelatin in 12 ml water were prepared at 35° C. via sonication for 1 hour to dissolve the gelatin granulates. Quantities of SDS from 0.0 wt % to 0.66 wt % were then dispersed into the solution. The solution was then stirred gently to achieve a homogeneous mix. The aerogels were mixed in the solution for about 10 minutes till a tacky mixture was obtained. Thereafter, the mixture was casted onto a petri dish of 100 mm diameter or in a mould of 75 mm×50 mm by 25 mm on a metal dish laid with a porous sheet. The composites in mould was covered with an aluminum foil with holes and secured with tape to allow for sublimation of water to take place when placed under vacuum. The composite was then cooled to 4° C. in a refrigerator for 4 hours. This allowed the gelatin solution to lyophilize. The composite was further cooled to −25° C. in a freezer for another 3 hours. The fully frozen sample was then sublimated at −30° C. under vacuum for 24 hours. Full sublimation was achieved when the chamber temperature dropped to −45° C. Thereafter, the temperature was raised to ambient temperature at 2° C. min$^{-1}$. The pressure was increased by slight opening of the vent valve on the chamber for 4 hours. The fabrication process is shown in FIG. 3A, whereas the specimen is shown in FIG. 3B and FIG. 3C.

In some of the embodiments, the composites were frothed into a foamed mixture and subsequently added with aerogel granules. The compositions were slowly mixed for about 10 min before casting onto a mould. The composites were left to cure and dry under ambient conditions without undergoing freeze-drying.

Example 4

Experimental Studies

Example 4.1

Density

The foamed composite blocks were removed after curing at room temperature at the relative humidity of 60% and weighed. The densities of the various types of composite blocks were determined from the known dimensions of those block samples.

The foamed composite blocks were removed after curing at room temperature at the relative humidity of 60% and weighed. The densities of the various types of composite blocks were determined from the known dimensions of those block samples.

Example 4.2

Compression Tests

Figure 5:
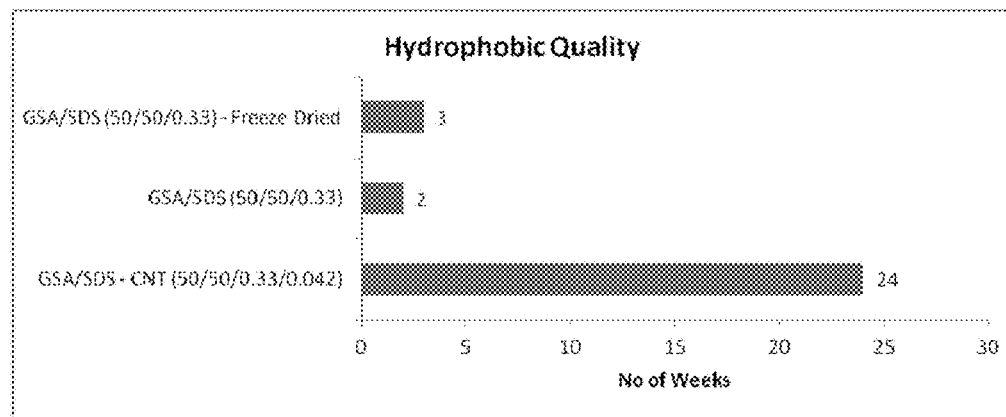
FIG. 5 is a graph showing comparison of hydrophobic quality of samples in water.

Each sample block was then cut into a square specimen of x-y dimensions of 17.5 mm±2.5 mm with 27.5 mm±1.5 mm height (in z-direction) using razor blades. The specimens were compression tested in the z-direction at the rate of 1.0 mm/min, nominal strain up to 45%. Each specimen was loaded in compression using 500 N±4% load cell with the initial load of 25% of the nominal strain for 1 minute and, thereafter was unloaded as shown in FIG. 5. The amount of sample height recovery was measured after 1 minute upon unloading. The expression used for calculating the strain recovery is—

$$SR = \left(1 - \frac{\Delta L}{CS}\right) \times 100\%$$

where SR=Strain recovery, CS=Compressive strain (mm), and ΔL=Change in length of specimen due to compression (mm)

Example 4.3

Thermal Conductivity

Thermal conductivity was measured using Lee's Disc Method. The set-up consisted of 3 copper plates (CP) with the dimensions of 75 mm×45 mm×3 mm and a heater measuring 75 mm×45 mm×1 mm. The heater was connected to the constant power source. Thermal probes were placed on top of the 1st CP, at the side of 2nd CP, at the side of the composite block, and at the bottom of the 3rd CP. The composite was sandwiched between the CPs and placed in an enclosed chamber at ambient pressure and temperature for 2 hours until the temperatures reached steady state with the various temperatures recorded at this juncture.

Example 4.4

Hydrophobic Quality

Hydrophobic quality of the composition was evaluated based on the number of days the specimens floated on water without degrading. Rao et al (Rao AV, Kulkarni MM, Pajonk G M, Amalnerkar DP, Seth T., *Synthesis and Characterization of Hydrophobic Silica Aerogels Using Trimethylethoxysilane as a Co-Precursor. Journal of Sol-Gel Science and Technology.* 2003; 27:103-9) evaluated the hydrophobicity of trimethylethoxysilane/tetramethoxysilane (TMES/TMOS) aerogel based on contact angle and the absorption of water into the specimen over a period. They found that TMES/TMOS with molar ratio of greater than 1 can stay in water with marginal increase of weight (6%) after 3 months.

Similar technique was employed to evaluate hydrophobicity of composites disclosed herein.

Example 5

Results and Discussion

Example 5.1

Embodiment 1

Lumira® aerogel LA1000, gelatin, SDS were fabricated via Freeze Drying Technique. The SDS content is fixed at 0.56 wt % through rigorous experimental trials and empirical modeling, for all the samples prepared. The proportion represents the ratio of gelatin to silica aerogels by weight fractions.

The density, compressive modulus and strength, strain recovery, thermal conductivity results are shown in TABLE 1.

TABLE 1

Density, compressive strength, compressive modulus, strain recovery, and thermal conductivity

| | Gelatin wt % | Aerogel wt % | P (g/cm$^3$) | Compressive Strength (MPa) | Compressive Modulus (MPa) | Strain Recovery @ 0.45 strain | Thermal Conductivity (mW/m-K) |
|---|---|---|---|---|---|---|---|
| 1A | 10 | 90 | 0.06 ± 0.00 | 0.042 ± 0.001 | 0.20 ± 0.04 | 0.76 ± 0.03 | 24.62 |
| 1B | 20 | 80 | 0.08 ± 0.01 | 0.216 ± 0.005 | 0.90 ± 0.11 | 0.78 ± 0.03 | 25.85 |
| 1C | 30 | 70 | 0.08 ± 0.01 | 0.250 ± 0.025 | 1.02 ± 0.18 | 0.72 ± 0.02 | 26.11 |
| 1D | 40 | 60 | 0.093 ± 0.01 | 0.438 ± 0.061 | 1.77 ± 0.11 | 0.63 ± 0.01 | 28.15 |
| 1E | 50 | 50 | 0.102 ± 0.01 | 0.697 ± 0.047 | 3.26 ± 0.50 | 0.59 ± 0.02 | 32.27 |

Example 5.2

Embodiment 2

Lumira® aerogel LA1000, gelatin, SDS were fabricated via frothing technique. The SDS content was fixed at 0.33 wt % and 0.66 wt % to evaluate the strength at the maximum strain. The thermal conductivity, density and compressive strength at the maximum strain are shown in TABLE 2.

TABLE 2

Thermal conductivity, density and compressive strength at maximum strength

| | Gelatin wt % | Aerogel wt % | SDS wt % | P (g/cm$^3$) | Max Strain | Strength @ Max Strain (MPa) | Thermal Conductivity (mW/m-K) |
|---|---|---|---|---|---|---|---|
| 2A | 10 | 90 | 0.33 | 0.067 | 0.60 | 0.20 | 18 |
| 2B | 20 | 80 | 0.33 | 0.091 | 0.59 | 0.27 | 37.1 |
| 2C | 30 | 70 | 0.33 | 0.105 | 0.64 | 0.79 | 23.7 |
| 2D | 50 | 50 | 0.33 | 0.115 | 0.70 | 1.74 | 24.4 |
| 2E | 10 | 90 | 0.66 | 0.069 | 0.47 | 0.13 | 28.4 |
| 2F | 20 | 80 | 0.66 | 0.091 | 0.46 | 0.21 | 24.9 |
| 2G | 30 | 70 | 0.66 | 0.094 | 0.58 | 0.43 | 28.7 |
| 2H | 50 | 50 | 0.66 | 0.105 | 0.63 | 1.47 | 31 |

Example 5.3

Embodiment 3

Lumira® aerogel LA1000, gelatin, SDS and CNTs were mixed and the blocks were fabricated via frothing technique.

The variation in the composition on density, compressive modulus and strength, strain recovery and thermal conductivity results are shown in TABLE 3A and 3B. The properties were evaluated under the compressive strain at 33.3% and 44.4%. Functional MWCNT-COOHs were purchased from Nanostructured & Amorphous Materials, Inc.

TABLE 3A

Density and thermal conductivity

| | % Mass Fraction | | | | Density | Thermal Conductivity |
|---|---|---|---|---|---|---|
| ID | Gelatin | Aerogel | SDS | CNT | (g/cm$^3$) | (mW/m-K) |
| 3A | 10 | 90 | 0.33 | 0.042 | 0.049 | 21.2 |
| 3B | 20 | 80 | 0.33 | 0.042 | 0.067 | 18.1 |
| 3C | 30 | 70 | 0.33 | 0.042 | 0.075 | 17.4 |
| 3D | 50 | 50 | 0.33 | 0.042 | 0.111 | 18.5 |
| 3E | 10 | 90 | 0.33 | 0.083 | 0.04 | 35.7 |

TABLE 3A-continued

Density and thermal conductivity

| | % Mass Fraction | | | | Density | Thermal Conductivity |
|---|---|---|---|---|---|---|
| ID | Gelatin | Aerogel | SDS | CNT | (g/cm$^3$) | (mW/m-K) |
| 3F | 20 | 80 | 0.33 | 0.083 | 0.081 | 25.1 |
| 3G | 30 | 70 | 0.33 | 0.083 | 0.093 | 22.9 |
| 3H | 50 | 50 | 0.33 | 0.083 | 0.11 | 24 |
| 3I | 10 | 90 | 0.66 | 0.042 | 0.043 | 22.1 |
| 3J | 20 | 80 | 0.66 | 0.042 | 0.054 | 29 |
| 3K | 30 | 70 | 0.66 | 0.042 | 0.055 | 30.1 |
| 3L | 50 | 50 | 0.66 | 0.042 | 0.073 | 26 |
| 3M | 10 | 90 | 0.66 | 0.083 | 0.043 | 35.9 |
| 3N | 20 | 80 | 0.66 | 0.083 | 0.057 | 22.8 |
| 3O | 30 | 70 | 0.66 | 0.083 | 0.064 | 23 |
| 3P | 50 | 50 | 0.66 | 0.083 | 0.091 | 23.8 |

TABLE 3B

Strain recovery, modulus and strength

| | Strain Recovery | | Modulus | | Strength (MPa) | |
|---|---|---|---|---|---|---|
| ID | N3 @ 33.3% | N4 @ 44.4% | N3 @ 33.3% | N4 @ 44.4% | N3 @ 33.3% | N4 @ 44.4% |
| 3A | 86.6 | 76.4 | 0.10 | 0.19 | 0.02 | 0.05 |
| 3B | 87.0 | 79.8 | 0.29 | 0.39 | 0.06 | 0.11 |
| 3C | 83.9 | 76.5 | 0.67 | 0.65 | 0.10 | 0.17 |
| 3D | 74.5 | 61.4 | 2.44 | 3.31 | 0.36 | 0.58 |
| 3E | 92.4 | 81.8 | 0.02 | 0.03 | 0.01 | 0.01 |
| 3F | 80.3 | 79.2 | 0.32 | 0.30 | 0.06 | 0.08 |
| 3G | 78.2 | 73.5 | 0.78 | 0.72 | 0.14 | 0.23 |

TABLE 3B-continued

Strain recovery, modulus and strength

| | Strain Recovery | | Modulus | | Strength (MPa) | |
|---|---|---|---|---|---|---|
| ID | N3 @ 33.3% | N4 @ 44.4% | N3 @ 33.3% | N4 @ 44.4% | N3 @ 33.3% | N4 @ 44.4% |
| 3H | 67.6 | 64.3 | 3.05 | 2.69 | 0.38 | 0.54 |
| 3I | 75.6 | 77.2 | 0.08 | 0.12 | 0.02 | 0.03 |
| 3J | 75.5 | 74.2 | 0.21 | 0.28 | 0.04 | 0.08 |
| 3K | 65.4 | 64.2 | 0.34 | 0.36 | 0.06 | 0.09 |
| 3L | 63.5 | 51.5 | 1.31 | 1.24 | 0.15 | 0.19 |
| 3M | 86.8 | 83.8 | 0.06 | 0.09 | 0.01 | 0.02 |
| 3N | 86.9 | 85.5 | 0.19 | 0.28 | 0.04 | 0.07 |
| 3O | 77.0 | 70.6 | 0.23 | 0.34 | 0.06 | 0.10 |
| 3P | 65.0 | 54.9 | 2.21 | 2.48 | 0.22 | 0.42 |

Example 5.4

Embodiment 4

Figure 6A:
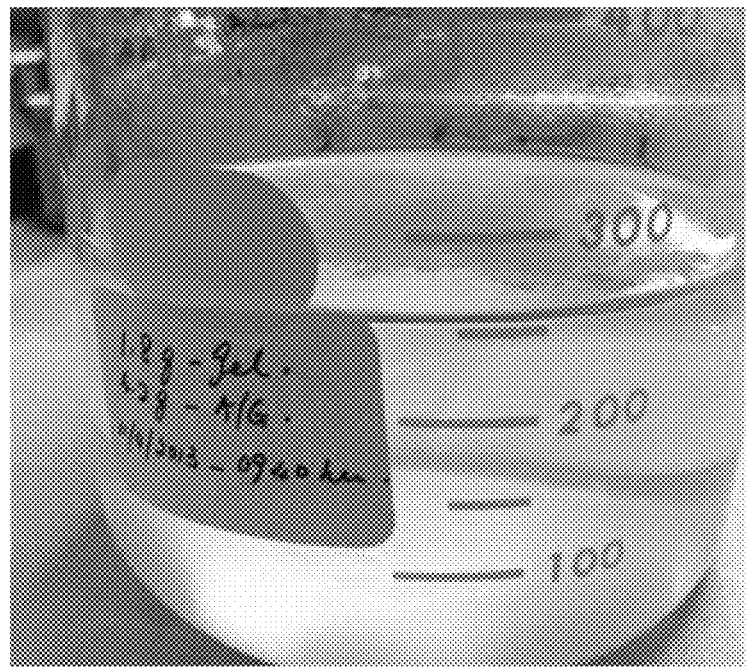
FIGS. 6A and 6B depict photographs showing gelatin/silica aerogel/sodium dodecyl sulfate (GSA/SDS) and gelatin/silica aerogel/sodium dodecyl sulfate—carbon nanotubes (GSA/SDS-CNT) blocks in water.
Figure 6B:
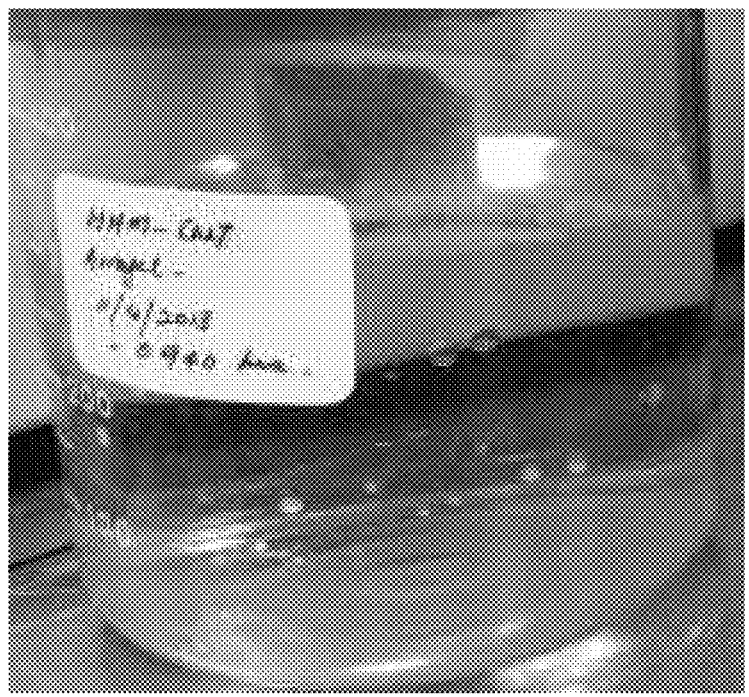

The bar chart in FIG. 5 shows the number of weeks the GSA/SDS and GSA/SDS-CNT composites were immersed in water. The gelatin network surrounding the aerogel granules in the GSA/SDS deteriorated due the water absorption. The GSA/SDS-CNT block, however, did not show any degradation in quality or water absorption; see the picture in FIGS. 6A and 6B. The numbers in the brackets of FIG. 5 are the % w/w of gelatin, aerogel, SDS and CNT in that order.

Example 6

Commercial Applications

Cellular solids-like behavior and the high strain recovery in the GSA-SDS composites has several advantages. Firstly, behavior of the composite changes from brittle-elastic to elastomeric material-like. Secondly, addition of SDS delays the onset of a complete composite failure due to a compressive force as seen from the high strains recorded. Thirdly, addition of SDS shows the capacity of the composites to absorb a large amount of compression (greater than 50%) and still exhibit significant recovery upon unloading (approximately 75-90% of original). This makes it an ideal cushioning material that has excellent thermal insulation properties (evaluated to be in the range of 0.018 W/m·K to 0.032 W/m·K) and considerably low density (0.059 g/cm$^3$ to 0.115 g/cm$^3$). The composites also have good specific modulus ($32 \times 10^7$ cm$^2$s$^{-2}$) and specific strength ($7.33 \times 10^6$ cm$^2$s$^{-2}$ to $6.8 \times 10^7$ cm$^2$s$^{-2}$).

Figure 7A:
FIGS. 7A and 7B are photographs showing GSA-SDS composites supporting metal weights illustrating its good cushioning effect and strength.
Figure 7B:
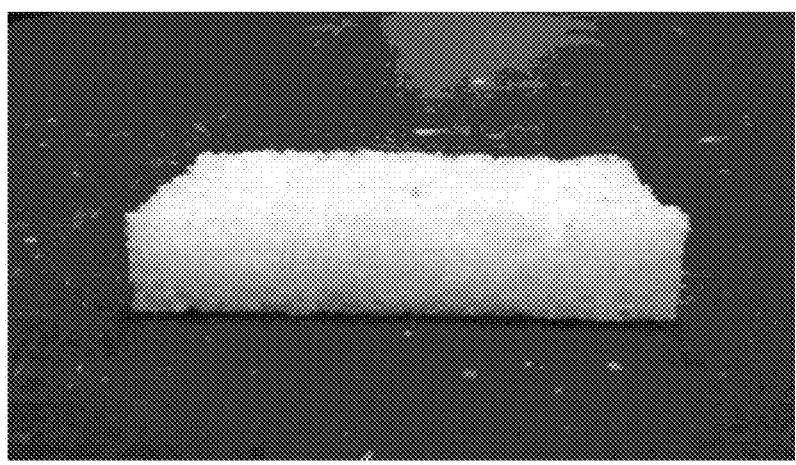

FIGS. 7A and 7B shows a GSA-SDS composite block supporting weights more than 2500 times its own weight without any visible damage.

GSA-SDS/CNT composite blocks show that adding insignificantly small amounts of CNT improves hydrophobicity of the composite. The GSA-SDS/CNT composite was able to retain its structure and network without any signs of degradation when immersed in water for sufficiently long period of time. Furthermore, on the contrary to usual assumption and experience, the addition of CNTs reduces the thermal conductivity of the composite approximately by 25%.

In summary, various embodiments of the invention are expected to offer an optimized material solution for impact, thermal and acoustic management in aerospace, defense, structural applications, sports goods, and many other engineering applications.

Example 7

Completed Works with Current Invention

The initial trials for producing GSA-SDS composites were carried out using frothing method. Two types of samples, GSA and GSA-SDS composites were produced and studied for their compression behavior. The results and analysis of the obtained experimental data showed that strain recovery is only possible when SDS is added in; refer FIG. 8A and FIG. 8B for the difference made and the role played by SDS.

Example 8

Excellent Hydrophobicity Due to CNT-Doping of GSA-SDS Composites

GSA-SDS and GSA-SDS/MWCNT composite blocks were fabricated in the same manner as previously described with an addition 0.017% wt, 0.033% wt and 0.05% wt of MWCNTs into the aqueous gelatin-SDS solution. A total of 16 composite blocks comprising of 48 specimens of various granule sizes were tested for contact angle measurements.

Figure 9:
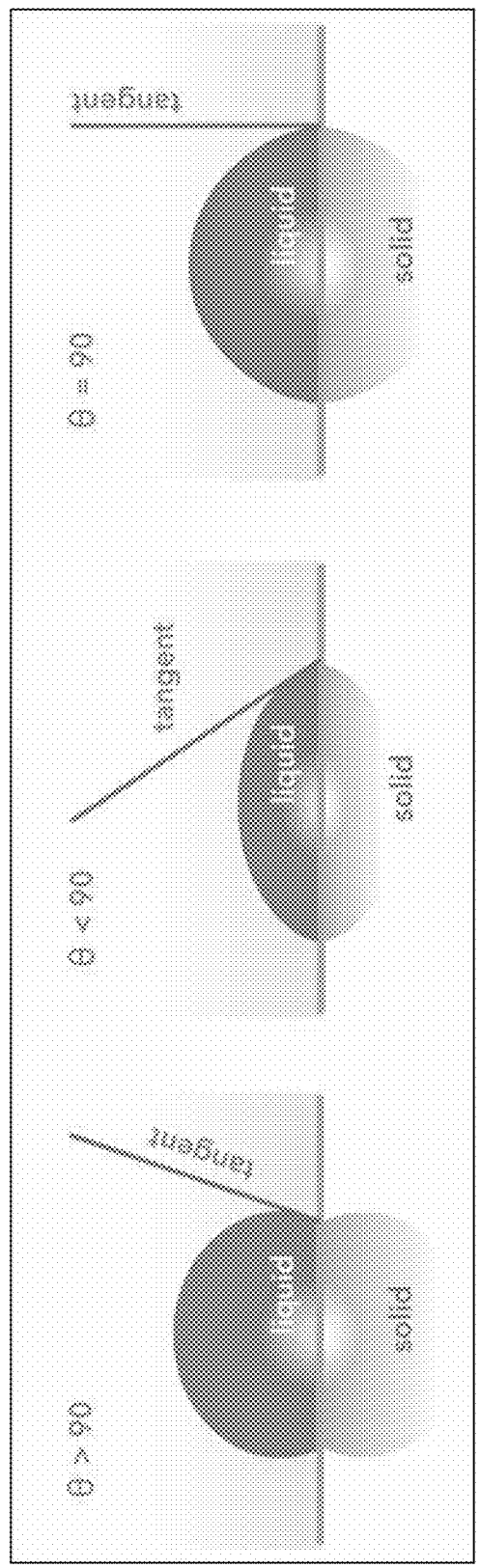
FIG. 9 is an illustration of a contact angle on a solid surface.

Contact angle, θ, is a quantitative measure of wetting of a solid by a liquid. It is defined geometrically as the angle formed by a liquid at the three-phase boundary where a liquid, gas and solid intersect. From FIG. 9, it can be seen that the low contact angle values indicate that the liquid spreads on the surface while high contact angle values show poor spreading. If the contact angle is less than 90° it is said that the liquid wets the surface, zero contact angle representing complete wetting. Generally contact angle measurements that show more than 90° indicate that the material is hydrophobic. For super-hydrophobic materials the contact angles are greater than 150°.

Contact angles can be divided into static and dynamic angles. Static contact angles are measured when droplet is standing on the surface and the three-phase boundary is not moving.

Figure 10:
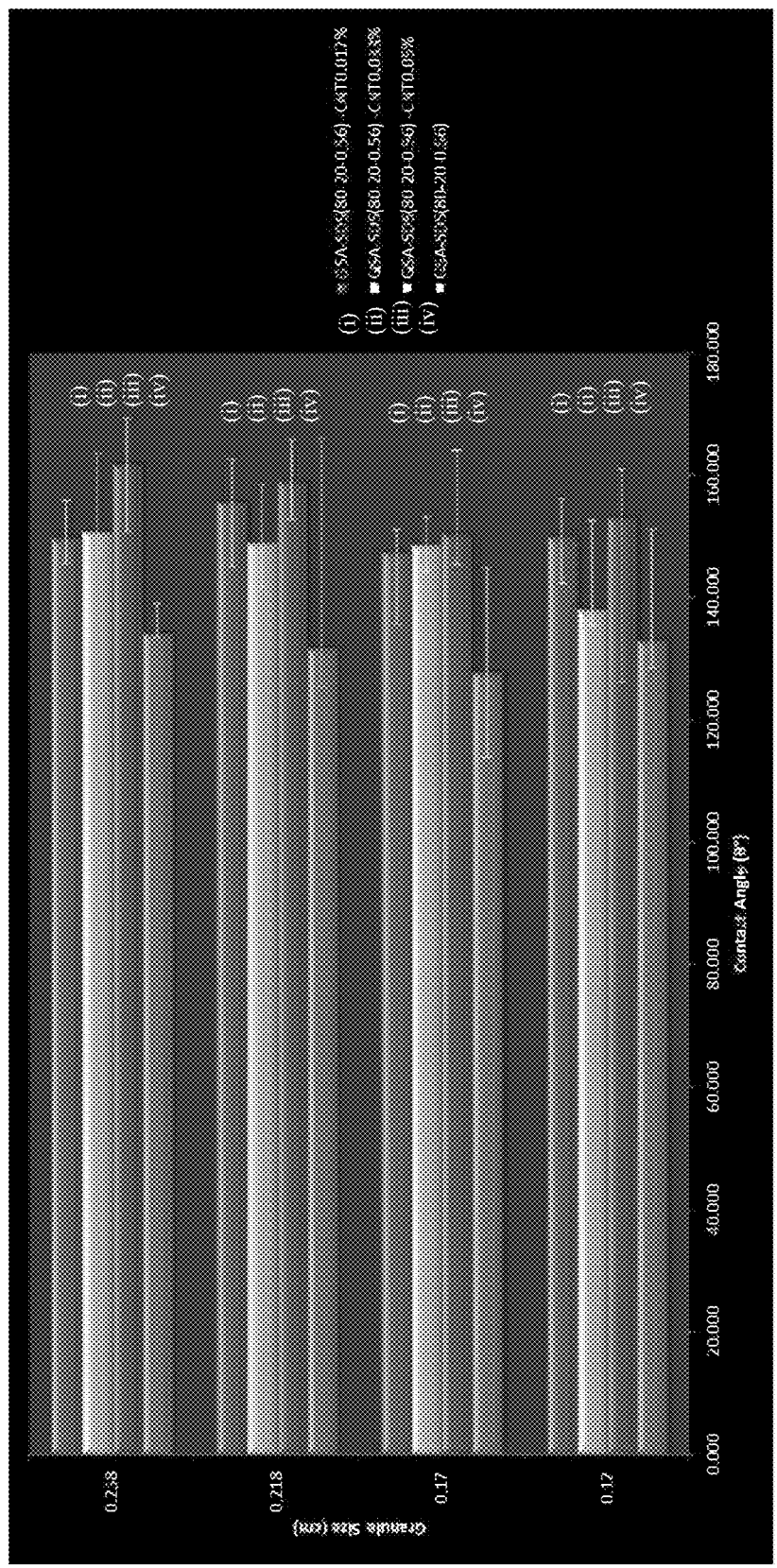
FIG. 10 is a graph summarizing contact angle results.

The contact angle results in FIG. 10 show that all the composites are generally hydrophobic. However, with the addition of MWCNTs, the measured contact angles are in the range 138° to 160°. Furthermore, the trend also shows that hydrophobicity increases with increase in the granule size of aerogels and addition of MWCNTs increases the contact angle by approximately 12% to super-hydrophobicity.

As an example of the experiments carried out, Lumira® aerogel LA1000, gelatin, SDS and MWCNTs were mixed and the blocks were fabricated via freeze-drying technique. Aerogel granules of 0.12 cm, 0.17 cm, 0.218 cm and 0.258 cm were used. The contact angle measurements, the indication of hydrophobicity of the composites, are shown in TABLE 4.

TABLE 4

Contact angle measurement

| | Granule Size | % Mass Fraction | | | | Contact Angle |
|---|---|---|---|---|---|---|
| ID | (cm) | Gelatin | Aerogel | SDS | CNT | θ° |
| 1 | 0.12 | 20 | 80 | 0.56 | 0 | 133.1 ± 10.2 |
| 2 | 0.17 | 20 | 80 | 0.56 | 0 | 127.7 ± 12.9 |
| 3 | 0.218 | 20 | 80 | 0.56 | 0 | 131.8 ± 18.9 |

TABLE 4-continued

Contact angle measurement

| ID | Granule Size (cm) | % Mass Fraction | | | | Contact Angle θ° |
|---|---|---|---|---|---|---|
| | | Gelatin | Aerogel | SDS | CNT | |
| 4 | 0.258 | 20 | 80 | 0.56 | 0 | 134.3 ± 2.1 |
| 1A | 0.12 | 20 | 80 | 0.56 | 0.017 | 149.9 ± 4.9 |
| 2A | 0.17 | 20 | 80 | 0.56 | 0.017 | 147.4 ± 6.7 |
| 3A | 0.218 | 20 | 80 | 0.56 | 0.017 | 155.8 ± 7.6 |
| 4A | 0.258 | 20 | 80 | 0.56 | 0.017 | 149.8 ± 3.9 |
| 1B | 0.12 | 20 | 80 | 0.56 | 0.033 | 138.0 ± 7.9 |
| 2B | 0.17 | 20 | 80 | 0.56 | 0.033 | 148.6 ± 3.6 |
| 3B | 0.218 | 20 | 80 | 0.56 | 0.033 | 148.9 ± 7.4 |
| 4B | 0.258 | 20 | 80 | 0.56 | 0.033 | 150.8 ± 7.0 |
| 1C | 0.12 | 20 | 80 | 0.56 | 0.05 | 153.2 ± 15.0 |
| 2C | 0.17 | 20 | 80 | 0.56 | 0.05 | 150.4 ± 8.1 |
| 3C | 0.218 | 20 | 80 | 0.56 | 0.05 | 159.1 ± 5.3 |
| 4C | 0.258 | 20 | 80 | 0.56 | 0.05 | 162.0 ± 8.0 |

Quantitative measurements to evaluate the hydrophobicity of the GSA-SDS/MWCNT were carried out via contact angle measurements. This was done to supplement the previously reported immersion test of the composites in water on the hydrophobic quality. The contact angles were carried out on different composite variation and still showed improved results with significant increase in the contact angle.

This substantiates the earlier finding that the CNT-doped GSA-SDS composites are "super-hydrophobic" and definitely are very promising materials of future.

Example 9

Superior Acoustics Absorptive Performance of GSA-SDS and GSA-SDS/MWCNT Composites GSA-SDS and GSA-SDS/MWCNT composite blocks were fabricated in the same manner as previously described with an addition of 0.025% wt of MWCNTs into the aqueous gelatin-SDS solution. A total of 16 composite blocks of 0.12 cm and 0.17 cm aerogel granules were tested for acoustic absorptive performance via impedance tube, especially the property of absorption coefficient was of key interest. The absorption coefficient can be expressed as follows, where R is the reflected energy, T is the transmitted energy and I is the incident energy.

$$\alpha = 1 - \left|\frac{R}{I}\right|^2 - \left|\frac{T}{I}\right|^2$$

when the absorbing material is backed by a rigid wall, as in the case with impedance tube, no acoustic energy is transmitted and therefore the absorption coefficient reduces to $$\alpha = 1 - \left|\frac{R}{I}\right|^2.$$

A comparison of the absorption coefficients of various compositions of GSA-SDS and GSA-SDS/MWCNT were carried out with commercially available sound absorbing materials. The findings suggest that these composites can be used as acoustic absorbers or barriers.

Figure 11:
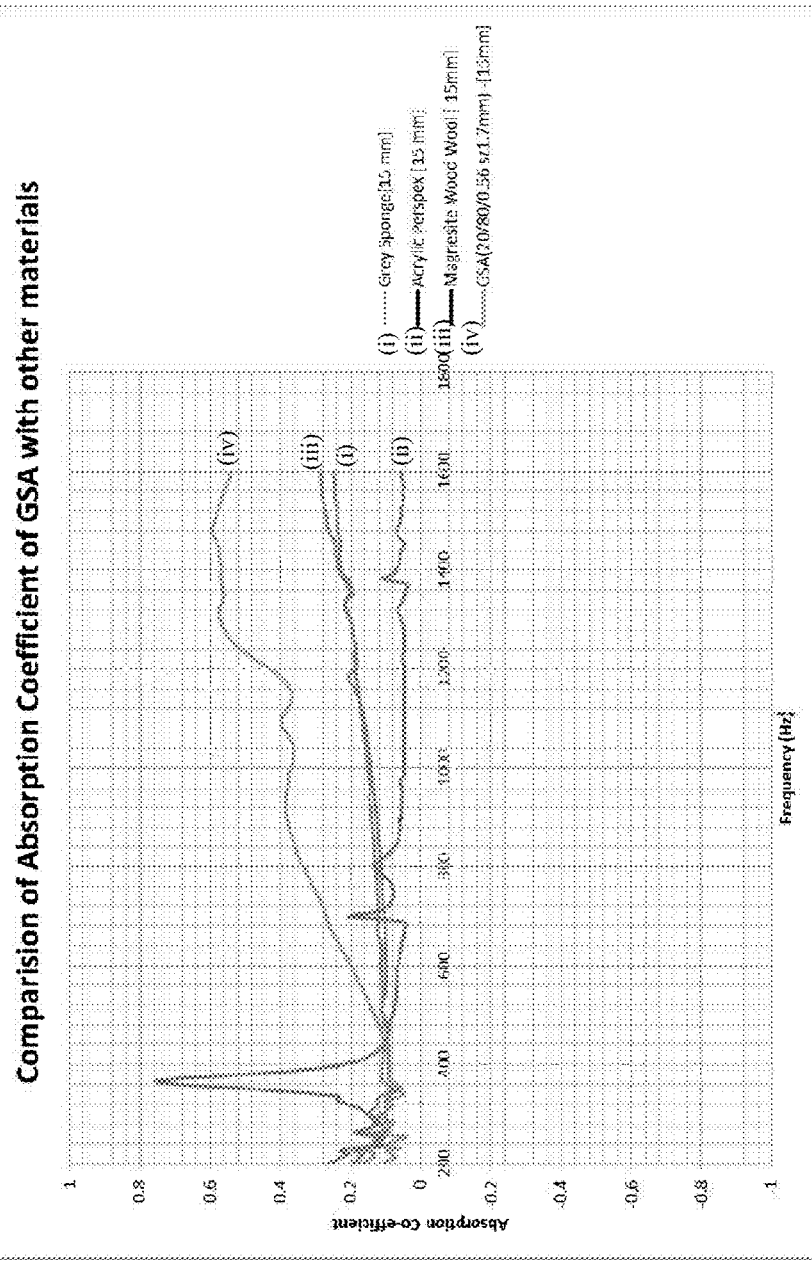
FIG. 11 is a graph showing comparison of GSA-SDS composite with commercial sound absorbers.

FIG. 11 shows that all the absorption coefficient of GSA-SDS composite (granule size 0.17 cm) compared with commercially used materials. GSA-SDS composite exhibit close to 60% sound absorption from 1200 to 1600 Hz frequency range. The GSA-SDS composite have superior sound absorption almost 2.5 times to that of magnesite wood wool; the magnesite wood wool purchased from Heradesign®. This is also higher than acrylic Perspex and grey sponge.

Figure 12:
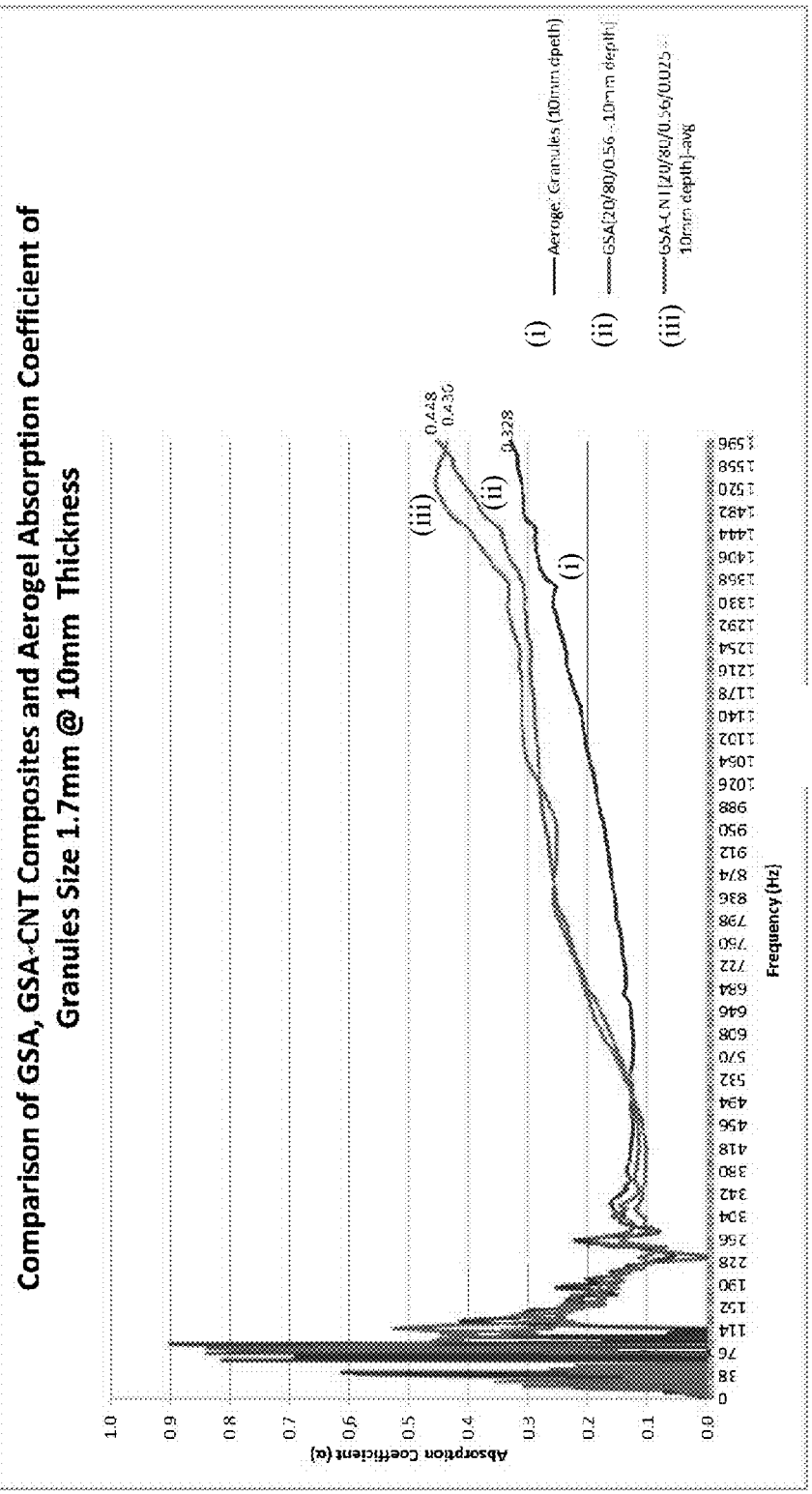
FIG. 12 is a graph showing comparison of acoustic absorption coefficient for 10 mm thick specimens of GSA-SDS composites, GSA-SDS/CNT composites, and the aerogel granules (aerogel granule of size 1.7 mm used for all).
Figure 13:
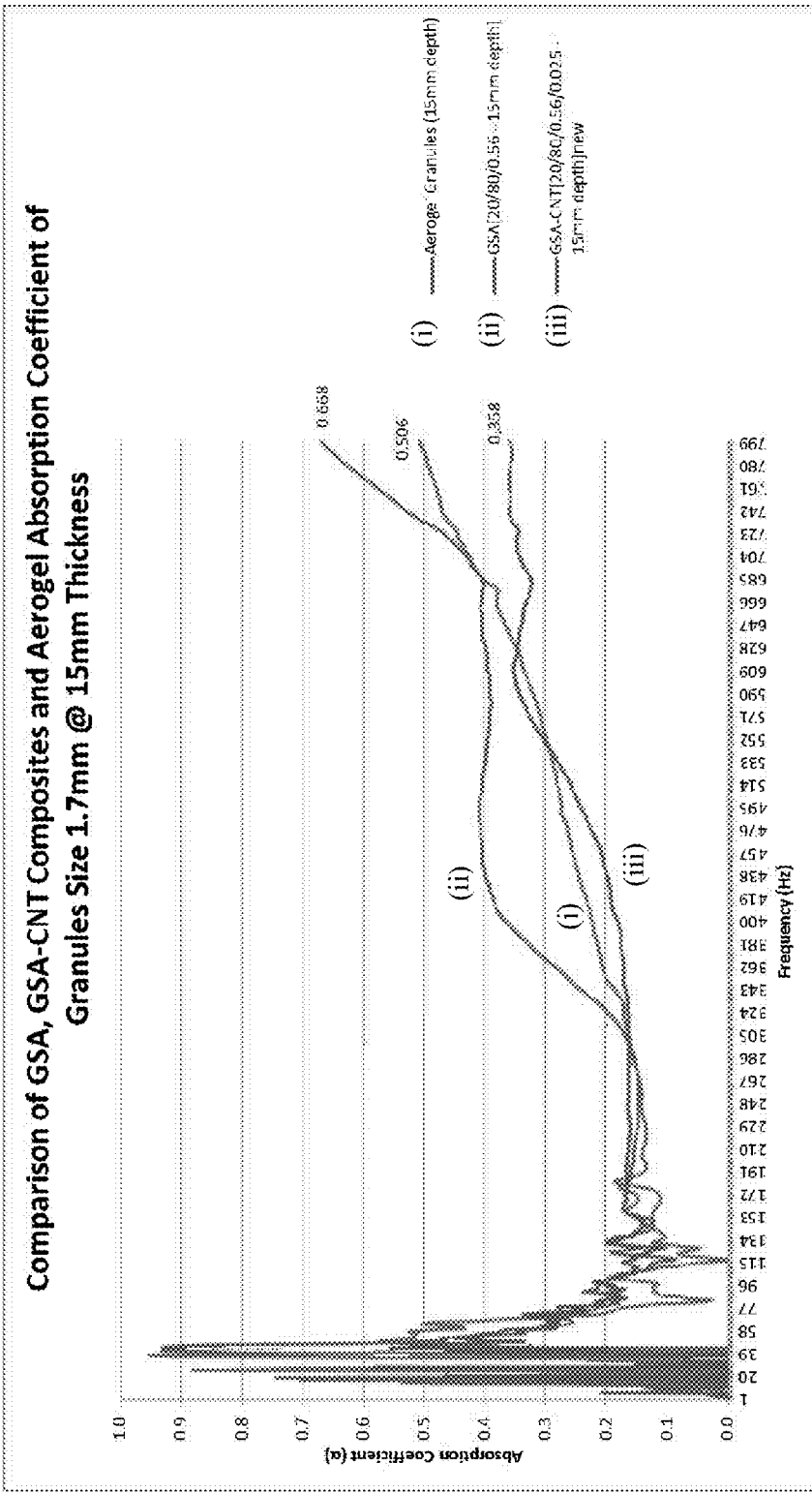
FIG. 13 is a graph showing comparison of acoustic absorption coefficient for 15 mm thick specimens of GSA-SDS composites, GSA-SDS/CNT composites, and the aerogel granules (aerogel granule of size 1.7 mm used for all). Plots in FIG. 12 and FIG. 13 show that GSA-SDS composite blocks offer improved acoustic absorption over the neat aerogel granules of the same size. Addition of CNT revealed mixed results, where 10 mm blocks offered higher acoustic absorption, but not the 15 mm thick GSA-SDS/CNT composite blocks.

FIG. 12 and FIG. 13 show the improved absorption coefficient of the composites (both with and without CNT) over the neat aerogel granules for two sample sizes of 10 mm and 15 mm. It was noted that the addition of CNTs (0.025% wt) did not show favorable results.

Acoustic absorption coefficients of various GSA-SDS and GSA-SDS/MWCNT composite blocks were measured and compared with commercial products via impedance tube as per ASTM E1050/C384. The composites tested, exhibited a good absorptive performance, almost 2.5 times to that of the other absorbing material.

These results show the great potential these GSA-SDS and GSA-SDS/MWCNT composites hold as acoustic barrier materials.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing a silica aerogel composite, the method comprising
    providing an aqueous solution comprising a water soluble polymeric binder and a surfactant,
    adding a silyl-modified silica aerogel to the aqueous solution to form a mixture, and
    freeze-drying the mixture under reduced pressure at a temperature sufficient to sublime water in the mixture, thereby physically binding the water soluble polymeric binder to the silyl-modified silica aerogel to obtain the silica aerogel composite.

2. The method according to claim 1, wherein providing the aqueous solution comprising a water soluble polymeric binder and a surfactant comprises
    dissolving the water soluble polymeric binder in an aqueous medium, and
    adding the surfactant to the aqueous medium comprising the water soluble polymeric binder.

3. The method according to claim 2, wherein steps a) and b) are carried out under agitation.

4. The method according to claim 2, wherein amount of water soluble polymeric binder in the aqueous medium is in the range of about 10 wt % to about 50 wt %.

5. The method according to claim 2, wherein amount of surfactant in the aqueous medium comprising the water soluble polymeric binder is in the range of about 0.01 wt % to about 0.66 wt %.

6. The method according to claim 1, wherein the water soluble polymeric binder comprises at least one of —COOH or —NH$_2$ functional groups on a surface of the water soluble polymeric binder.

7. The method according to claim 1, wherein the water soluble polymeric binder is gelatin, collagen, polyacrylamide, polyvinyl pyrrolidone, polymethacrylamide, polyvinyl alcohol, or combinations thereof.

8. The method according to claim 1, wherein the water soluble polymeric binder comprises or consists of gelatin.

9. The method according to claim 1, wherein the surfactant is an ionic surfactant is an anionic carboxylate, a cationic quaternary ammonium salt, an amphoteric sulfonate, an amphoteric carboxylate, an amphoteric phosphate, or combinations thereof.

10. The method according to claim 1, wherein the surfactant is sodium dodecyl sulfate, cetyl trimethylammonium bromide, perfluorononanoate, lecithin, or combinations thereof.

11. The method according to claim 1, wherein providing the aqueous solution comprising a water soluble polymeric binder and a surfactant comprises adding carbon nanotubes to the aqueous solution.

12. The method according to claim 11, wherein amount of carbon nanotubes in the aqueous solution is 0.084 wt % or less.

13. The method according to claim 1, wherein the silyl-modified silica aerogel comprises one or more —$SiR_3$ functional groups, wherein R at each occurrence is independently a $C_1$-$C_5$ alkyl group.

14. The method according to claim 13, wherein R is —$CH_3$.

15. The method according to claim 1, wherein size of the silyl-modified silica aerogel is in the range of about 0.05 cm to about 0.5 cm.

16. The method according to claim 1, wherein freeze-drying the mixture is carried out at a temperature in the range of about −50° C. to about 0° C.

* * * * *